April 8, 1969   M. S. KEELER II   3,437,240
GASOLINE DISPENSING SYSTEM WITH REGISTER
Filed Nov. 2, 1967
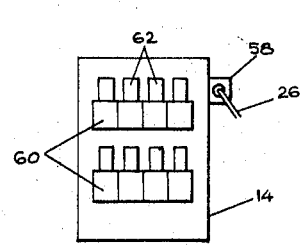
Fig. 2.
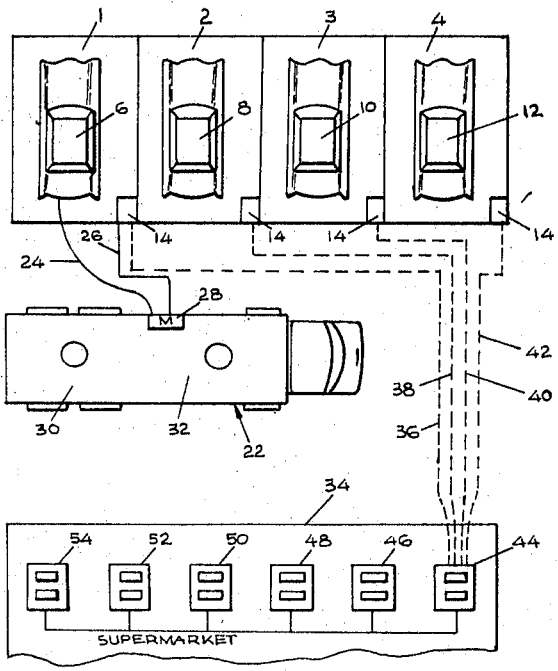
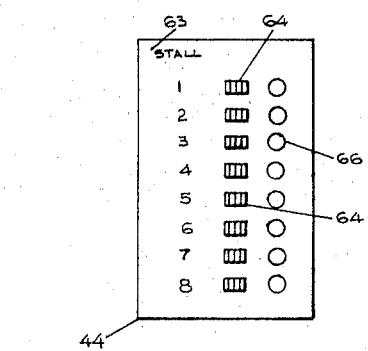
Fig. 3
Fig. 1
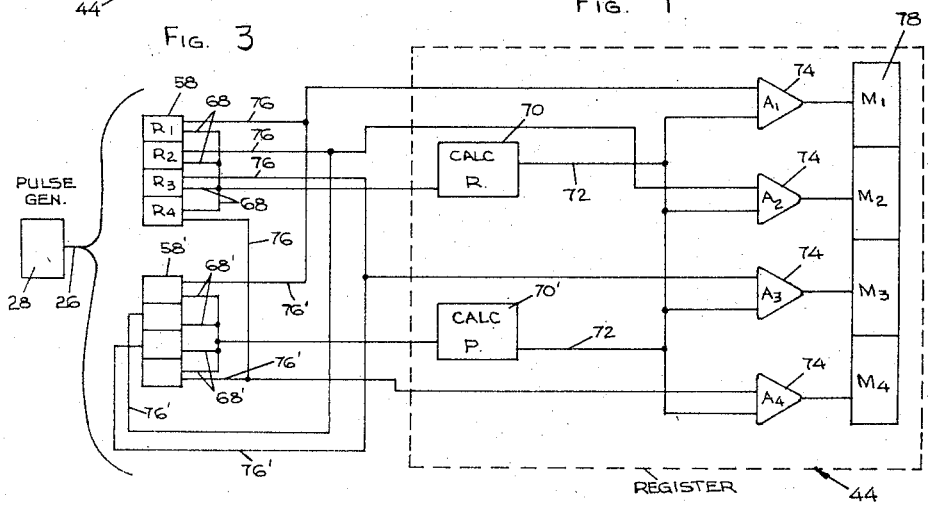
Fig. 4
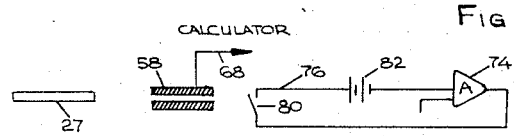
Fig. 5
INVENTOR.
MINER S. KEELER II
BY *Price, Heneveld,*
*Huizenga & Cooper*

United States Patent Office 3,437,240
Patented Apr. 8, 1969

3,437,240
GASOLINE DISPENSING SYSTEM
WITH REGISTER
Miner S. Keeler II, 2525 Indian Trail SE.,
Grand Rapids, Mich. 49506
Filed Nov. 2, 1967, Ser. No. 680,082
Int. Cl. B67d 5/06, 5/16, 5/22
U.S. Cl. 222—25                    12 Claims

ABSTRACT OF THE DISCLOSURE

This disclosure relates to a dispensing system for liquids such as gasoline and the like. The system employs a movable dispensing means which is adapted to dispense, for example, a plurality of grades of gasoline to cars in a plurality of stalls. The amount of liquid dispensed at each stall is automatically transmitted to a register in a store spaced from the stall. The register indicates and/or records the quantity of sale or the cost of the sale for each particular stall. Means are provided to reset each meter at the register as the amount of sale is paid by the customer.

This invention relates to a liquid dispensing system wherein liquid is dispensed by a movable dispenser to one of a plurality of containers at stalls by a movable or portable dispensing means, and wherein register means are provided at a spaced distance from the stalls to record the quantity and/or cost of the liquid dispensed.

In this age of convenience and efficiency, the small neighborhood shops are being replaced by mammoth shopping centers and large scale retail outlets. This trend is establishing an efficient one-stop shopping system in this country. Many efforts have been made by major shopping areas to dispense gasoline. However, in all of these systems, the customer must wait in his car as the gasoline is dispensed.

I have now discovered a liquid dispensing system which can be employed to dispense gasoline in a one-stop shopping operation, wherein the customer can have his gasoline tank filled with gasoline while he is shopping and can pay for the gasoline as he checks out of the store.

Many gasoline dispensing systems are available for automatic dispensing of a predetermined amount of gasoline and for recording the amount of gasoline dispensed. However, each of these systems is directed to dispensing gasoline to tank trucks from permanent tanks, and cannot be adapted for the dispensing of gasoline to individual customers at supermarkets and the like.

By various aspects of this invention one or more of the following, or other, objects can be obtained.

It is an object of this invention to provide a liquid dispensing system which can be employed to dispense gasoline to a customer while he is shopping in a store.

It is a further object of this invention to provide a gasoline dispensing system which permits a customer to have his car filled while shopping and permits him to pay his bill when he checks out of the store.

It is yet another object of this invention to provide a gasoline dispensing system in which the amount of gasoline dispensed is automatically recording at a remote register and correlated to a particular location of the receiver of the gasoline.

Other aspects, objects, and the several advantages of this invention are apparent to one skilled in the arts of the study of this disclosure, the drawings, and the appended claims.

According to the invention there is provided a dispensing system comprising a movable liquid dispensing means having a measuring means associated therewith to measure the amount of liquids dispensed, a plurality of stalls containing containers to be filled, and a signal generating means associated with the measuring means to produce a signal representative of the quantity of liquid dispensed. A plurality of stalls, each having a receiving container to be filled with the liquid are provided. Signal generating means are associated with the measuring means to generate a signal representative of the quantity or cost of the liquid dispensed. Each stall has a means for receiving a signal generated from the signal generating means. The system includes a register means spaced from the stall receiving means and means are provided to transmit the signals from each stall receiving means to the register and for converting the signal received by the register to a visible indication of the quantity or cost of the liquid dispensed at each stall.

In a preferred embodiment of the invention, the dispensing system is employed in dispensing gasoline to automobiles in a plurality of stalls wherein the registers employed are in a supermarket and the like.

The invention will now be described with reference to the accompanying drawings in which:

FIG. 1 is a schematic representation of the system of the invention in its simplest form;

FIG. 2 is a front elevational view of a card holder and a signal receiving means at each stall;

FIG. 3 is a schematic representation of the type of register which can be employed in the supermarket according to the invention;

FIG. 4 is a view of a modified electrical system which can be used in the invention; and FIG. 5 is a detailed schematic view of a portion of the system as shown in FIG. 4.

Referring now to the drawings and to FIG. 1 in particular, the dispensing system will be described with reference to dispensing gasoline to automobiles positioned in a plurality of stalls 1 2, 3, and 4 in a parking lot for a supermarket generally designated as 34. The cars 6, 8, 10, and 12 are placed in the stalls to receive a predetermined amount of gasoline. Each stall contains a card holder 14 which also has a plug receiving socket. A gasoline dispensing truck generally designated as 22 having tank compartments 30 and 32 is employed in dispensing gasoline to the individual cars. The gasoline is dispensed through a hose 24. Separate hoses can be employed to dispense the gasoline from each compartment. However, it is preferred that the gasoline from each tank be dispensed through a common hose using a Y connection. The gasoline would then pass through a common meter. A meter 28 is provided to measure the amount of gasoline dispensed. In a preferred embodiment of the invention, the meter also has a calculating means as is commonly known in the industry to compute the total cost of the gasoline dispensed. In any case, the meter 28 generates a signal representative of the quantity or cost of the liquid dispensed and this signal is sent through a wire 26 to a plug socket or signal receiving means at stand 14. The signals are then sent, in one embodiment, through underground wires 36, 38, 40, or 42 to a register 44 in a supermarket 34 which is spaced from the stalls. The register 44 receives the information and, in the event that the cost is not calculated, can have a calculating means to compute the total cost of the sale at each stall. If the store has a plurality of registers such as 46, 48, 50, 52, and 54, an output signal from register 44 can be transmitted to these other registers through a common lead 56. Each register contains a visual indication such as a meter to show the amount of sale for each stall. In other words, each register will have as many meters as there are stalls.

In operation, the customer will drive into the supermarket parking lot and leave his car in one of the stalls. If he desires gasoline he will pick up a ticket from stand 14 which will indicate the quantity and kind of gasoline which he desires to be dispensed into his car tank. For example, different colored cards can be used to indicate the grade of gasoline and/or the quantity of gasoline desired. Further the cards can have blanks for the customer to write in the kind and amount of gasoline desired. Each car will have the stall number printed on it.

In any case, the customer will tear the card in half and place half of the card on the windshield. He will then go into the store to do his shopping. In the meantime, a gasoline dispensing truck 22 will circulate among the stalls. When he sees a card on the windshield, he will remove the card and dispense the amount of gasoline indicated on the card. Simultaneously, he will plug wire 26 into the receiving socket at stand 14. The driver can write down the license plate of the car and the time that the gasoline is dispensed. As the gasoline is dispensed, the sale is simultaneously recorded on all the registers in the supermarket. The register will indicate the amount and the stall at which the gasoline has been dispensed. When the customer checks out of the store with his purchases, the customer will give the checker the other half of the gasoline request stub which will also have an indication of the stall from which the stub has been taken. The checker will then look at the register and charge the customer according to the amount of the sale. As payment is made, the checker can reset the register to zero.

In the event that someone has forgotten to pay for the gasoline dispensed, the stubs retained by the checkers can be compared with the stubs retained by the truck driver at the end of each day. Any stubs which the truck driver has for which there is no corresponding stub retained by a checker will show which customers have not paid. The customers can be charged or billed since the license plate number of the car has been taken by the truck driver.

In the event that someone does not pay for the amount of gasoline dispensed in stall 1, for example, the register meter corresponding to stall 1 will be automatically reset each time the meter plug is inserted into the stall 1 socket. This automatic resetting of the meters will prevent charging a customer for his gasoline and that of a previous customer who did not pay for his gasoline.

Referring now to FIG. 2, there is shown an illustration of a stand which can be employed in the invention. The stand 14 contains a plurality of card-holding slots 60 in which are placed a plurality of cards or tickets 62. As has been hereinbefore described, the cards can indicate the quantity and grade of gasoline desired. In addition the tickets will also contain the stall number.

Each stall also contains a plug receiving socket 58 which received a plug on the end of wire 26.

An example of the register which can be employed in the invention is shown in FIG. 3. The register 44 contains a column 63 which indicates the stall number and a plurality of meter indicators 64 which shows the amount of sale at each stall. A reset button 66 is provided to reset the meters at each stall as the sale price is collected. As has been hereinbefore disclosed, the meter 44 is connected with the other meters and the reading at each meter is transmitted to the other meters. Conversely, when any of the meters are reset, all of the meters corresponding to that stall in each register will be reset.

An electrical system which can be employed in an embodiment of the invention is schematically shown in FIG. 4. In this system, the meter in the truck 28 will generate a pulse each time a gallon (or a tenth of a gallon) of liquid is dispensed. The stand will contain a plug socket for each grade of gasoline dispensed by the truck. In other words, if regular and premium gasoline, for example, are dispensed by the truck, each stand will have two plug sockets, one for regular and one for premium. In the schematic diagram, the regular plug sockets are designated as R1, R2, R3, and R4 and the premium plug sockets are designated as P1, P2, P3, and P4. The subscript numerals designate the stall at which the plug sockets are positioned. In other words, stall 1 has plug socket R1 and P1 and stall 2 has plug socket R2 and P2, etc. Each regular gasoline plug socket has a lead 68 which is connected to a calculator 70 which computes the total cost of the product from the number of gallons. The calculator 70 has a means to generate a signal representative of the cost of the product. That signal is passed through lead 72 and gates 74 as designated as A1, A2, A3, and A4 corresponding to each station. Conversely, each premium plug socket 58' has a lead 68' which is connected to calculator 70' which also calculates the cost of the gasoline dispensed. The calculator 70' generates a signal which is passed through lead 72' to and gates 74. Each of the calculators can be adjusted to vary the cost per gallon of the product dispensed.

Each of the plug sockets contains a lead 76 which is directly connected to an and gate corresponding to the stall at which the plug socket is positioned. In other words, a lead connects plug socket R1 with and gate A1. When a particular plug socket is activated, each of the premium plug sockets contain a lead 76' which also is connected to a corresponding and gate. When a particular plug socket, for example R1, is activated, the lead 76 transmits a signal to and gate A1 which opens the and gate to allow the signal from calculator 70 to pass through to the meter 78. Each and gate has a connection to a meter which corresponsds to the stall from which the signal originates.

In operation, the pulse generator (for example meter 28) will generate a pluse for each gallon (or tenth of a gallon) of liquid dispensed. The pulse will be transmitted to line 26. The plug on the end of line 26 will be plugged into, for example socket R1. When plug socket R1 is activated, the and gate A1 will be open. The pulse is then passed through lead 68 to calculator 70 which determines the cost of the product dispensed. A signal representative of the cost of the product is generated by calculator 70 and this is then passed through lead 72, and gate A1 to meter M1. The meter then will indicate the cost of the product dispensed at stall 1. When the plug on the end of line 26 is removed from plug socket R1, and gate A1 will then close to block off any signals going to meter M1. The truck can then move to the next stall and activate plug socket R2 or P2.

The system for activating the end gate is schematically sketched in more detail in FIG. 5. When the plug which can comprise a male member such as 27 is positioned into plug receiver 58, the end of the plug 27 will contact switch 80 to activate the circuit containing a battery 82 and and gate 74. When the plug is removed, the circuit will be opened and the and gate will then be closed.

In the described system, instead of the activating system shown in FIG. 5, the pulse can be split and passed to the and gate corresponding to the stall at which the plug socket is positioned. In this case diodes or the like would be placed in the lines 68 and 68' on the calculator side of the circuit from the point of pulse separation to prevent the activation of all of the and gates.

Whereas the invention has been described with reference to a particular embodiment, it is obvious that within the scope of the invention certain modifications can be made. For example, meter 28 can simply be a device which measures the quantity of liquid dispensed and produces an output pulse representative thereof. Such an instrument can be a meter model number S–50 manufactured by the A. O. Smith Company of Erie, Pa., and described in their meter catalogue. In this case, then there would be a plug socket on the stand for each grade of gasoline dispensed. In this case, the system described in FIG. 4 would be employed. It is obvious that with multiple grades of gasoline, multiple calculators, and multiple plug sockets can be used.

Alternately, the meter can employ a calculator which generates a signal representative of the cost of the liquid dispensed. In this case a single plug socket would be employed. The lead from the plug socket would go directly to the registers in the store.

Whereas the disclosed system employs wires to transmit the signals from the stand at each stall to the register, other transmitting means can be employed. For example, wireless transmitters can be employed to transmit the information to the registers. In this case the transmitter at each stall would have a different frequency than the other transmitters at the stalls. Additionally, the receivers would be adapted to receive all the frequencies, but a certain frequency would correspond to a certain stall. This information would then be channeled to the meter which corresponds to the stall from which the frequency emanated.

Whereas the invention has been described with reference to a register employing a meter-type of indicator, it is within the scope of these inventions to provide a printing means to print out the information required. For example, the register could employ a machine which automatically printed the stall number and the amount of sale and the time of day. The checker at each stall would then place the printed ticket in a rack having pockets corresponding to each stall.

The system is such that it can be employed in large or small operations. It can be employed in supermarkets with one or more registers. The system can also be employed in conjunction with a shopping center for example, in which there is contained a plurality of stores. The gasoline dispensing system could be hooked into all of the stores. In this instance, a plug socket or a series of plug sockets could be provided for each store at which the customer desired to have his account charged.

I claim:
1. A liquid dispensing system comprising:
a moveable liquid dispensing means,
a measuring means associated with said dispensing means to measure amount of liquid dispensed,
signal generating means associated with said measuring means to generate a signal representative of the amount of fluid measured by said measuring means,
a plurality of stalls,
each stall having a means for receiving a signal generated by said signal generating means,
register means spaced from said stalls,
means to transmit signals from each stall receiving means to said register, and
means for converting said signal received by said register to a visible indication of the liquid dispensed at each stall.

2. A liquid gasoline dispensing system comprising:
a moveable gasoline container having a dispensing means,
a measuring means associated with said dispensing means to measure the amount of fluid dispensed,
a signal generating means associated with said measuring means to generate a signal representative of the cost of the liquid dispensed,
a plurality of stalls,
means in each stall for receiving a signal generated by said signal generating means,
register means spaced from said stalls,
means to transmit signals from each stall receiving means to said register, and
means for converting said signal received to a visible indication of the cost of gasoline dispensed at each stall.

3. A liquid dispensing system comprising:
a moveable liquid source having dispensing means associated therewith,
measuring means associated with said dispensing means to measure the amount of liquid dispensed,
signal generating means associated with said measuring means to generate a signal representative of the quantity of liquid dispensed,
a plurality of stalls,
means at each stall for receiving a signal generated by said signal generating means,
register means spaced from said receiving means at each stall,
means to transmit signals from each stall receiving means to said register, and
means for converting said signal received by said registers to a visible indication of the cost of the liquid dispensed at each stall.

4. A liquid dispensing system according to claim 3 wherein said moveable liquid source comprises a vehicle having a plurality of tanks, each containing a separate liquid, and each stall having a signal receiving means for each liquid dispensable by said moveable liquid source.

5. A liquid dispensing system according to claim 4 wherein each signal receiving means is connected to a calculating means which converts the signal from the signal receiving means into a signal representative of the cost of the liquid dispensed, and means are provided to transmit the signal representative of the cost from said calculating means to a meter on said register representative of the stall in which the liquid is dispensed.

6. A liquid dispensing system according to claim 5 wherein there are provided a plurality of registers and a signal representative of the cost is transmitted to each register.

7. A liquid dispensing system according to claim 3 wherein said movable dispensing means is a truck having a plurality of fluid tanks and means are provided to dispense fluid from each tank.

8. A liquid dispensing system according to claim 3 wherein said receiving means at each stall comprises a plug socket and there is provided plug means associated with said signal generating means to cooperate with said stall plug socket to transmit said signal from said signal generating means to said stall signal receiving means.

9. A liquid dispensing system according to claim 3 wherein said transmitting means comprises a wireless transmitter wherein a signal is transmitted from each transmitter at each stall and each signal has characteristics representative of the stall from which the signal is sent.

10. A liquid dispensing system according to claim 3 wherein said register means contains a calculator and a signal generating means, and there are provided means to transmit a signal from the calculating means to a meter on the register representative of the stall at which said signal was received, and a means to gate the signal from said signal generating means to said meter representative of the stall at which the liquid is dispensed.

11. A liquid dispensing system according to claim 3 wherein said converting means comprises a printing means and a signal representative of the quantity is printed onto a card, and means are provided to print onto the card the stall at which the liquid is dispensed.

12. A liquid dispensing system according to claim 3 wherein said register has manual resetting means to reset the amount of purchase at each stall as the account is paid.

References Cited

UNITED STATES PATENTS

| | | | |
|---|---|---|---|
| 2,307,435 | 1/1943 | Von Opel. | |
| 2,538,243 | 1/1951 | Hazard et al. | |
| 2,547,967 | 4/1951 | Patten | 222—35 |
| 2,934,102 | 4/1960 | Martin | 222—2 X |
| 3,170,597 | 2/1965 | Reichenberger | 222—36 |
| 3,200,993 | 8/1965 | Headrick | 222—178 X |
| 3,220,606 | 11/1965 | Mesh et al. | 222—35 |
| 3,244,323 | 4/1966 | Stankiewicz | 222—26 |
| 3,252,620 | 5/1966 | Houle et al. | 222—2 |
| 3,367,537 | 2/1968 | Robinson et al. | 222—33 |

SAMUEL F. COLEMAN, *Primary Examiner.*

U.S. Cl. X.R.

222—30, 35